United States Patent
Guenec et al.

(10) Patent No.: US 8,903,425 B2
(45) Date of Patent: Dec. 2, 2014

(54) METHOD AND SYSTEM FOR ACCESSING PLACES

(75) Inventors: Mathieu Guenec, Cap d'Ail (FR); Mikael Harrén, Helsingborg (SE)

(73) Assignee: Amadeus S.A.S., Biot (FR)

( * ) Notice: Subject to any disclaimer, the term of this patent is extended or adjusted under 35 U.S.C. 154(b) by 163 days.

(21) Appl. No.: 13/274,026

(22) Filed: Oct. 14, 2011

(65) Prior Publication Data

US 2013/0059603 A1   Mar. 7, 2013

(30) Foreign Application Priority Data

Sep. 7, 2011 (EP) ................................. 11306112

(51) Int. Cl.
*H04W 24/00* (2009.01)
*H04M 1/66* (2006.01)
*H04B 7/00* (2006.01)
*H04B 5/00* (2006.01)
*G06Q 10/02* (2012.01)
*G07C 9/00* (2006.01)
*H04M 1/725* (2006.01)

(52) U.S. Cl.
CPC ............ *G06Q 10/02* (2013.01); *G07C 9/00904* (2013.01); *G07C 9/00571* (2013.01); *H04M 1/72522* (2013.01)
USPC ................ 455/456.3; 455/456.1; 455/456.2; 455/411; 455/41.2; 455/414.1; 705/4; 705/5; 705/21; 705/13; 705/27.1; 705/39; 705/26.1; 705/41; 705/44; 705/65

(58) Field of Classification Search
USPC ............. 705/14.73, 21, 5, 41, 44, 26.1, 65, 1, 705/13, 39, 27.1, 4; 455/456.2, 411, 552.1, 455/456.1, 41.2, 414.1
See application file for complete search history.

(56) References Cited

U.S. PATENT DOCUMENTS

| 7,110,744 B2 | 9/2006 | Freeny, Jr. |
| 7,315,823 B2 | 1/2008 | Bröndrup |

(Continued)

FOREIGN PATENT DOCUMENTS

| EP | 1 536 382 A2 | 6/2005 |
| EP | 2 275 986 A1 | 1/2011 |
| JP | 2002-149887 | 5/2002 |

OTHER PUBLICATIONS

Extended European Search Report for European Application No. 11306112.1 (Jan. 18, 2012).

(Continued)

*Primary Examiner* — Inder Mehra
(74) *Attorney, Agent, or Firm* — Wood, Herron & Evans LLP (57) ABSTRACT

A method for automatic access to a pre-reserved place may operate on a hotel reservation system, which can communicate with a user smart phone application. The method includes receiving a request from the user smart phone application to effect entry into the pre-reserved place. The request includes user data relating to the user and location data relating to the place. The location data relating to the place is obtainable by the user using the smart phone to scan a code on or in the vicinity of the place and decode the code to identify the location data relating to the place. The user data and the location data are compared with a list of pre-reserved places to identify a matching pre-reserved place. If a matching pre-reserved place is identified, a signal is automatically sent to cause the pre-reserved place to be opened to allow access by the user.

14 Claims, 6 Drawing Sheets

(56) References Cited

U.S. PATENT DOCUMENTS

| | | |
|---|---|---|
| 2001/0016819 A1 | 8/2001 | Kolls |
| 2002/0187779 A1* | 12/2002 | Freeny, Jr. .................... 455/422 |
| 2003/0208386 A1 | 11/2003 | Brondrup |
| 2004/0220822 A1* | 11/2004 | Talarico ........................... 705/1 |
| 2006/0122870 A1* | 6/2006 | Austin et al. ..................... 705/3 |
| 2007/0176739 A1 | 8/2007 | Raheman |
| 2007/0200665 A1* | 8/2007 | Studerus .................... 340/5.61 |
| 2009/0066476 A1 | 3/2009 | Raheman |
| 2010/0191551 A1* | 7/2010 | Drance et al. .................... 705/5 |
| 2010/0201536 A1* | 8/2010 | Robertson et al. ......... 340/686.6 |
| 2011/0238514 A1 | 9/2011 | Ramalingam et al. |
| 2013/0059598 A1* | 3/2013 | Miyagi et al. .............. 455/456.1 |

OTHER PUBLICATIONS

Kristiansen et al., "Position technologies for internet connected mobile terminals, offering location based audio services," pp. 1-59 (May 2007).

* cited by examiner

METHOD AND SYSTEM FOR ACCESSING PLACES

PRIORITY CLAIM

This application claims the benefit of European Patent Application No. 11306112.1 filed Sep. 7, 2011, the disclosure of which is incorporated herein by reference.

FIELD OF THE INVENTION

The present invention relates to a method and system for accessing places, such as hotel or meeting rooms.

BACKGROUND OF THE INVENTION

In the travel industry there is a continual focus on making travel more convenient and easier for the traveler. This has provoked development of advanced technology, methods and systems to continue to make traveling easier. Online check-in for flights is an example of an advanced technology which reduces queuing time and requires less airline personnel.

One of the most time-consuming and resource consuming processes in a hotel is the check-in desk which handles both the check-in and check-out processes and often many other queries and enquiries. Queuing is frustrating for the traveler and often causes significant delay. In addition, especially at peak times, the hotel has to allocate significant resources to the check-in and check-out processes. In the hospitality industry the use of advanced technology would be helpful in this area. As a result, the travel experience would be more convenient and easier for the traveler and less costly for the hotelier.

US 2003/0208386 discloses a wireless reservation, check-in, access control, check-out and payment system. A mobile terminal is in communication with the reservation, check-in, access control and payment systems of the hotel. Room opening in the hotel is managed by means of the private key transferred to the mobile terminal and then subsequently transmitted to the door via Bluetooth. The system includes the expense of adapting the door to include a Bluetooth emitter and receiver and the requirement of a processor to control and check the received key.

US 2010/0201536 relates to a system and method for accessing a structure using a mobile device. The system is based on RFID (Radio Frequency Identification) technology and all the hotel doors have to be equipped with an RFID reader. Short-range wireless communications detect the proximity of the user's mobile device to effect opening. Again, this system requires adaptation of the doors and incurs the cost of adding equipment to every door used within the system.

US 2010/0191551 (Drance et al.) discloses a method and system to provide a remote communication between a user and a hotel registration system by using a smart phone. The user can remotely ask for a check-in process by sending a request to the hotel registration system. The user sends identification information which relates to a credit card number or a hotel reservation number, for example. In addition, the smart phone can operate as a key for the room door. The hotel registration system can send an electronic key in a form of a pattern for an electrical reader located near the room door. Again, the system requires costly equipment to be added to every door in each hotel.

In a large infrastructure, such as a hotel, the expense of adding readers or other devices to every door in each hotel is a huge expense which has made the prior art systems mainly unworkable.

A need still exists for a method and system which overcomes the problems of the prior art and can add the convenience and ease of advanced technology to the processes and methodologies of gaining access to a hotel room or the like.

One object of the present invention is to overcome at least some of the problems associated with the prior art.

SUMMARY OF THE INVENTION

The present invention provides a method and system for accessing locations, as described in the accompanying claims.

According to one aspect of the present invention there is provided a method to allow automatic access by a user to a pre-reserved place, such as a hotel room, the method operating on a system, such as a hotel reservation system, which can communicate with a user smart phone application, the method comprising:
  receiving at the system a request from the user smart phone application to effect entry into the pre-reserved place, wherein the request includes user data relating to the user and location data relating to the place, which location data relating to the place is obtainable by the user using the smart phone to scan a code on or in the vicinity of the place and decode the code to identify the location data relating to the place;
  comparing in the system the user data and the location data with a list of pre-reserved places to identify a matching pre-reserved place;
  if a matching pre-reserved place is identified automatically sending a signal to cause the pre-reserved place to be opened to allow access by the user.

Optionally providing the code in the vicinity of the place as a QR code.

Optionally decoding the code identifies the name of a hotel and the number of a room.

Optionally the step of receiving the request includes receiving user credentials and identifying a corresponding user ID.

Optionally wherein the comparing step comprises comparing the user ID and the location data with existing bookings to determine the matching pre-reserved place.

Optionally processing reservations made by users and storing the reservations in a database for future access.

According to a second aspect of the present invention there is provided a system for allowing automatic access by a user to a pre-reserved place, such as a hotel room, the system, such as a hotel reservation system, can communicate with a user smart phone application, the system comprising:
  a receiver for receiving a request from the user smart phone application to effect entry into the pre-reserved place, wherein the request includes user data relating to the user and location data relating to the place, which location data relating to the place is obtainable by the user using the smart phone to scan a code on or in the vicinity of the place and decode the code to identify the location data relating to the place;
  a comparison module for comparing the user data and the location data with a list of pre-reserved places to identify a matching pre-reserved place;
  wherein if a matching pre-reserved place is identified a signal is sent to cause the pre-reserved place to be opened to allow access by the user.

The present invention provides a number of advantages. A hotel guest is able to reserve and open a hotel room without having to go through the reception process in the hotel. An automatic door opening system can be put in place without having to modify the doors or any hotel systems by adding expensive readers or devices. The hotel can potentially reduce the number of staff required to handle check-in of guests, particularly at peak times. The travel experience of the user is enhanced and queuing is avoided.

BRIEF DESCRIPTION OF THE DRAWINGS

Reference will now be made, by way of example, to the accompanying drawings, in which.

DETAILED DESCRIPTION OF THE PREFERRED EMBODIMENTS

The present invention relates to a method and system for accessing a place, such as a hotel room, by means of a remote, self-service, check-in procedure which has a minimum impact on the physical infrastructure of the hotel.

In the travel industry all aspects of management of the hotel are supported by a software system known as the property management system (PMS). The PMS has many functions including the management of room rates and inventory; check-in and room assignment; check-out and invoicing; housekeeping etc. The PMS is connected to external systems such as credit card payment systems, room access systems, etc.

A room access system and method allows the hotel to control access to the hotel rooms via the PMS. The hotel can issue key cards, temporarily or permanently lock or unlock doors of specific hotel rooms and generally control all access to the rooms in the hotel. As previously indicated complex room access systems, such as RFID or fingerprint identification processes, are expensive and are not widely used.

Another part of the hotel system is the hotel reservation system which manages the hotel reservations and is in communication with the PMS. The hotel reservation system is accessed during the system and method of the present invention.

A further element of the present invention is the use of the smart phone with associated applications that support the functionality of the present invention, as will be described in greater detail below.

Figure 1:
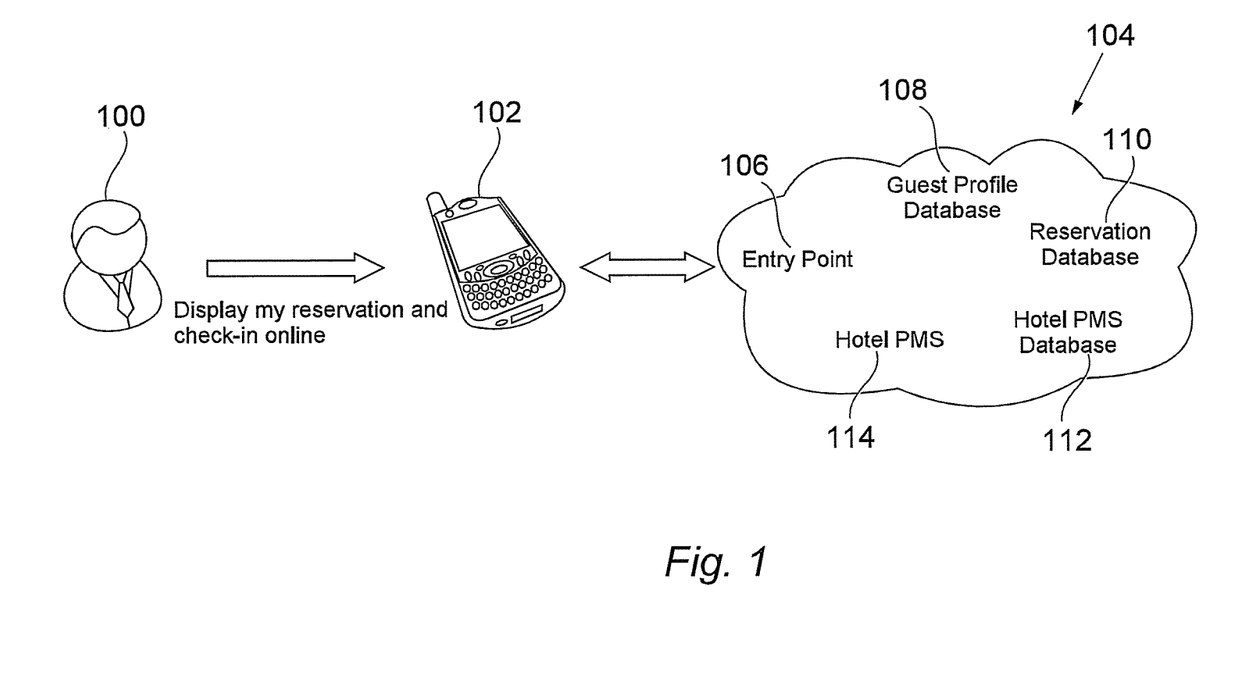
FIG. 1 is a schematic representation of a system and method for accessing a place, in accordance with an embodiment of the invention.

Referring to FIG. 1 an overview of the present invention is shown. A user 100 uses a smart phone 102 to communicate with the hotel system shown generally at 104. The hotel system includes a central reservation system 106, which may be specific to a particular chain of hotels. The hotel system also includes a guest profile database 108, a reservation database 110, a hotel PMS or equivalent database 112 and at least one hotel PMS 114.

The smart phone includes an application which displays information to the user in respect of reservations and online check-in information. In addition, the smart phone can be used to interact with the hotel system to make reservations and then to subsequently effect online check-in when the user is at the hotel door.

In order for the online check-in system to work, it is necessary to identify the hotel door. This is accomplished by fixing a label or other appropriate indicator on or in the vicinity of the hotel door. This label is capable of being scanned by the smart phone to extract the door information. The label may include a quick response (QR) code, a barcode, a written notice or any other appropriate unique identifier. A quick response code is a matrix barcode consisting of black modules arranged in the square pattern on a white background. The label may be made of any appropriate material and be fixed on or in the vicinity of the hotel door by any appropriate means. An example would be a QR code on a paper label stuck to the door. Use of this type of labeling offers an inexpensive means for identifying the door that can be used in any hotel and the system and method of the present invention. There is no need to provide expensive equipment and/or readers on each door, which in the past has made automatic systems too expensive.

Figure 2:
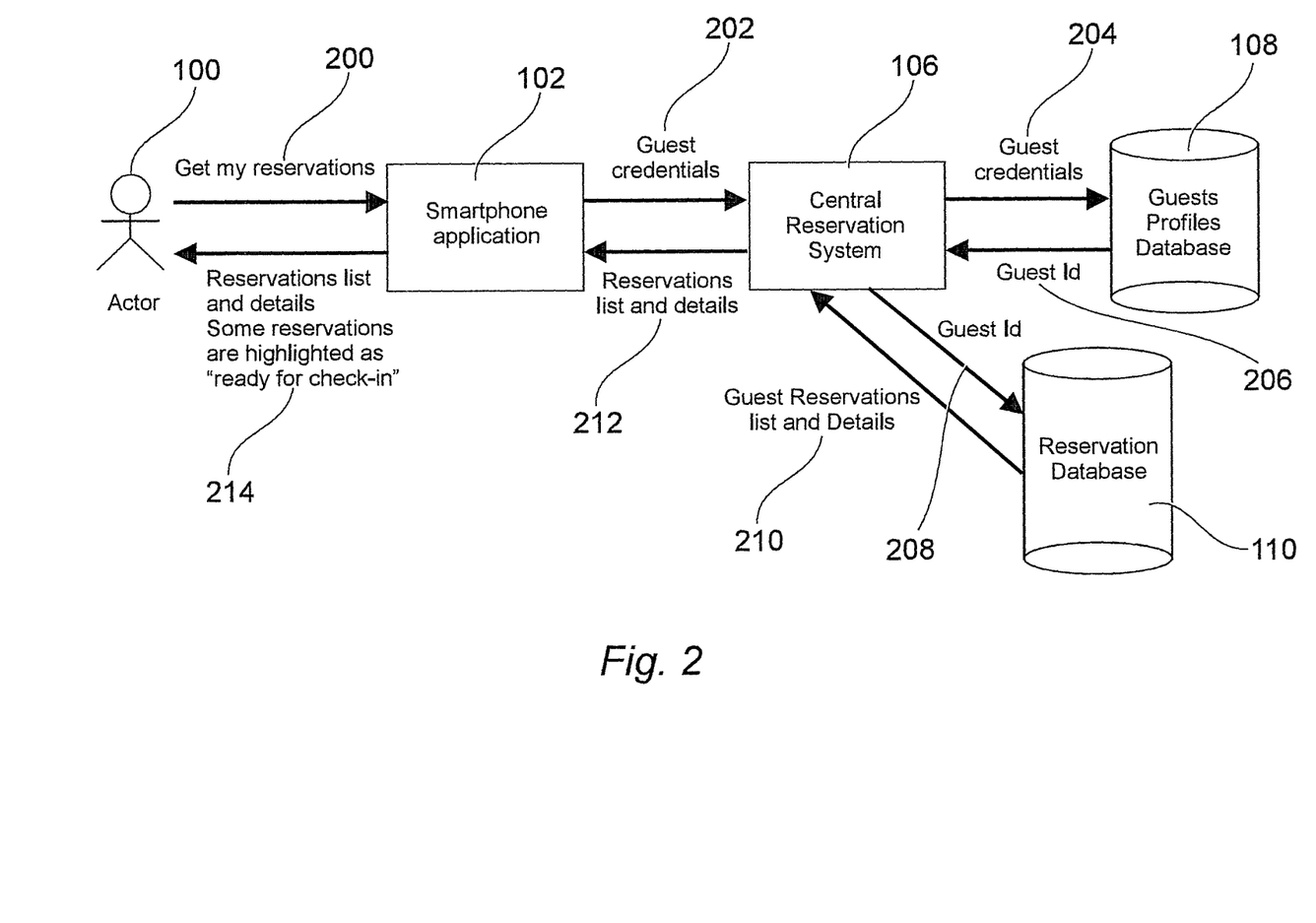
FIG. 2 is a flow chart of the messages and actions for a first part of the FIG. 1 system and method, in accordance with an embodiment of the invention.

Referring to FIG. 2, the process of determining existing or pre-reserved reservations in accordance with the present invention will now be described. A user or guest 100 is in communication with a smart phone 102. The smart phone is in communication with the central reservation system 106 of the hotel system 104. The central reservation system is in communication with the guest profile database 108 and the reservation database 110.

In a first step 200 the guest requests their reservations via the smart phone. The smart phone sends the guest credentials to the central reservation system in step 202. The guest credentials may be any appropriate identification, such as a loyalty card number, a credit card number, a name or any other appropriate information. The central reservation systems sends the guest credentials to the guest profile database in step 204 and the guest ID is communicated to the central reservation system in step 206. The guest ID is the identifier relevant to the system which provides a link to identify all relevant information for that particular guest. The guest ID is sent from the central reservation system to the reservation database in step 208. The reservation database generates a list of guest reservations, including any necessary details, and communicates this to the central reservation system in step 210. The central reservation system then sends the reservation list and details to the smart phone in step 212. The smart phone displays the reservation list and details to the user in step 214. The list may include reservations that are ready to check-in.

Figure 3:
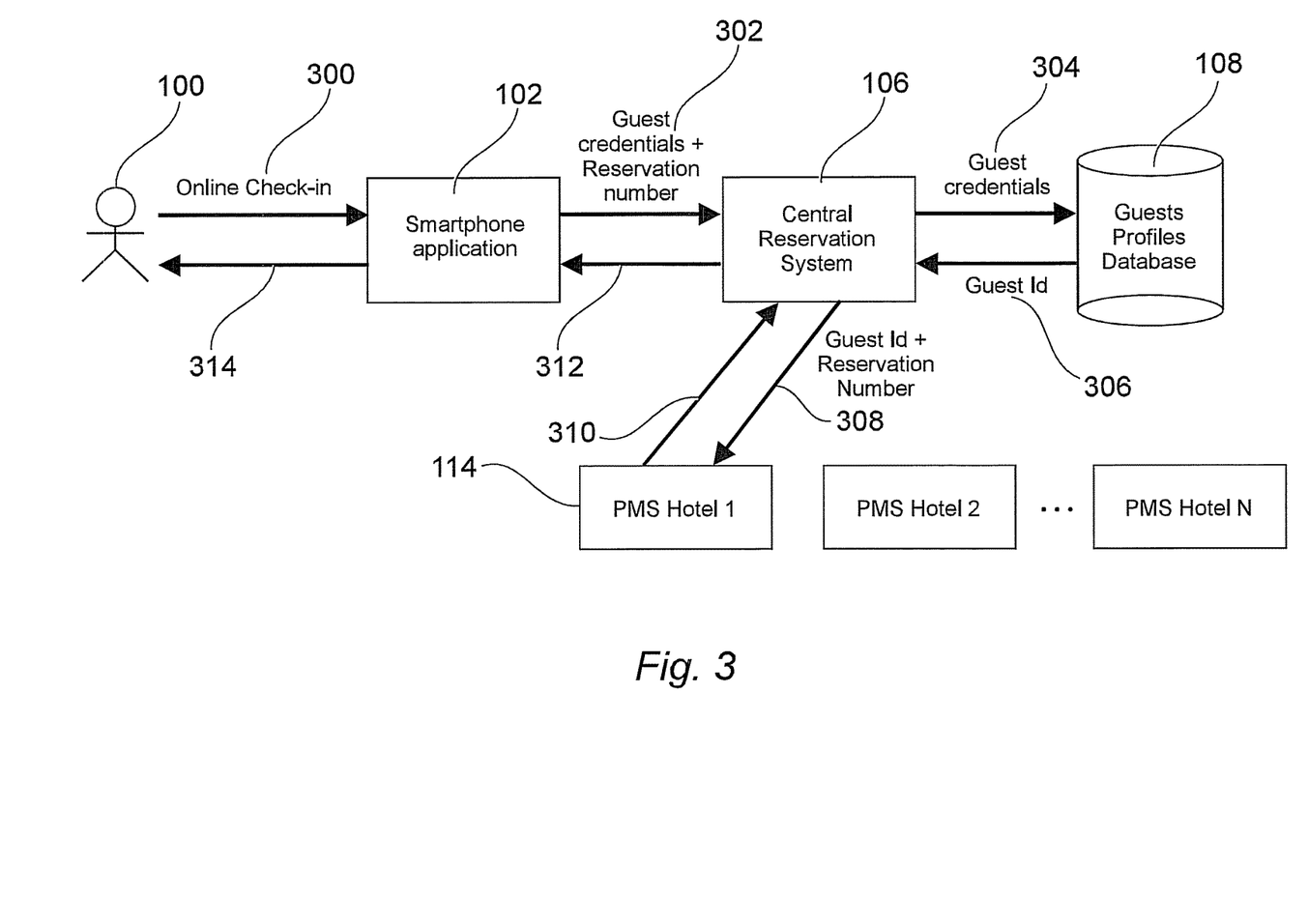
FIG. 3 is a flow chart of the messages and actions for a second part of the FIG. 1 system and method, in accordance with an embodiment of the invention.

Referring now to FIG. 3, the online check-in process will now be described. The user requests online check-in at step 300 and the smart phone generates a message at step 302 which is sent to the central reservation system. The message includes guest credentials and a reservation number relating to a pre-reserved booking. The central reservation system sends the guest credentials to the guest profiles database in step 304 and receives the guest ID in step 306. The guest ID and reservation number are then sent to the PMS of the appropriate hotel. The PMS of the appropriate hotel determines the availability of the room and whether online check-in can be validated at this time. If check-in is possible the PMS associates a particular room with the reservation and communicates the room number to the central reservation system in a step 310. The central reservation system sends the room details to the smart phone in step 312 and the details are displayed to the user in step 314. There are a number of reasons why check-in may not be possible at the time the user makes a request, these include: the hotel may have specific times for entry to a room, the housekeeping process may not have been completed, the previous guest may not yet have checked out, or any other appropriate reason.

Once the user has checked in using the above steps and has the room number of the hotel the user needs only to proceed directly to the hotel room. On arriving at the hotel room the user will find a label as described above, such as a QR code, barcode, or other appropriate labeling device. The user uses the smart phone to read and decode the QR code on the label in the vicinity of the hotel room. The QR code includes at least an indication of the hotel name and the room number. Once the smart phone has read and decoded the QR code, the smart phone will then interface with the central reservation system to effect entry to the room.

Figure 4:
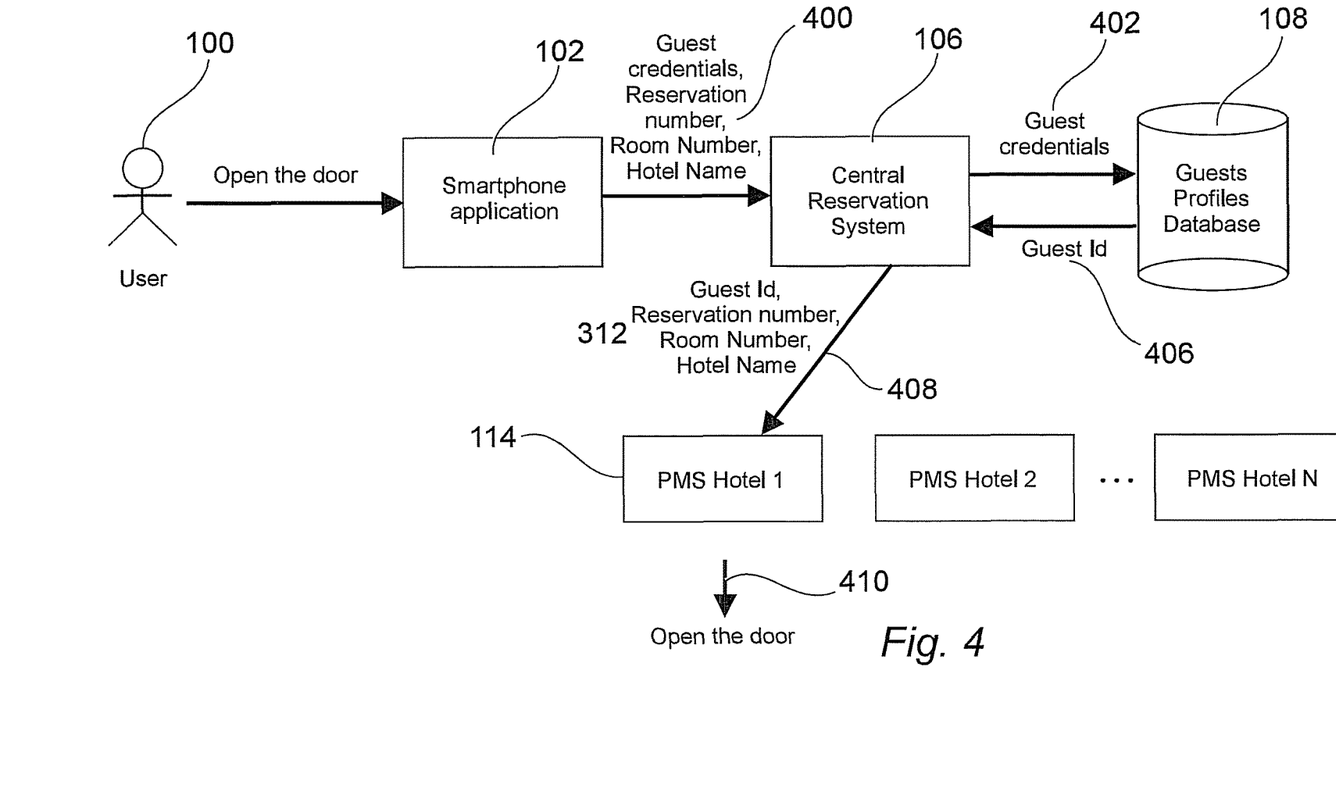
FIG. 4 is a flow diagram of the messages and actions for accessing the place, in accordance with an embodiment of the invention.

Referring now to FIG. 4, the room opening process will be described. On arrival at the hotel door the user wishes to open the door and enter the room. The smart phone sends the decoded room and hotel number from the QR code or other identification tags along with the guest credentials and reservation number to the central reservation system in step 400. The central reservation system sends the guest credentials to the guest profiles database, in step 402, in order to obtain the guest ID which is communicated back to the central reservation system in step 404. The central reservation system then sends the guest ID reservation number, hotel name and room number to the PMS of their appropriate hotel in step 406. The PMS verifies that the guest ID reservation number, room number and hotel name all correspond with the correct booking and open or unlock the door of the hotel room remotely at step 410. For future access to the room a traditional key or key-card may be available for the user inside the room. Alternatively, the user may continue to use the above-mentioned room opening process at any time.

Figure 5A:
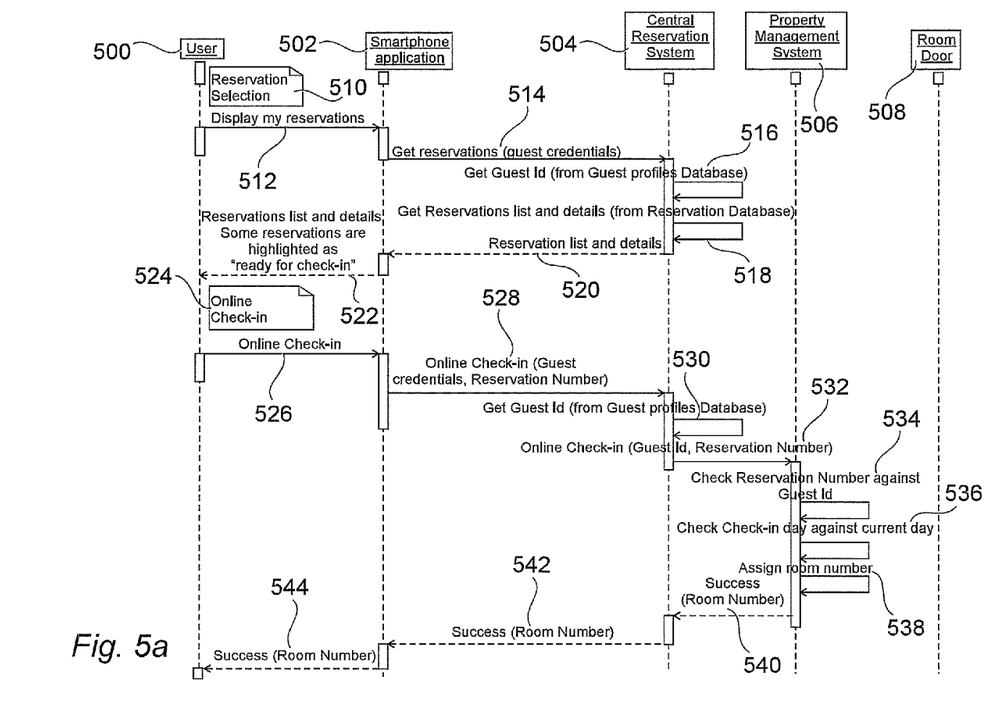
FIGS. 5a and 5b are sequence diagrams for the system and method for booking, checking in and accessing the place, in accordance with an embodiment of the invention.
Figure 5B:
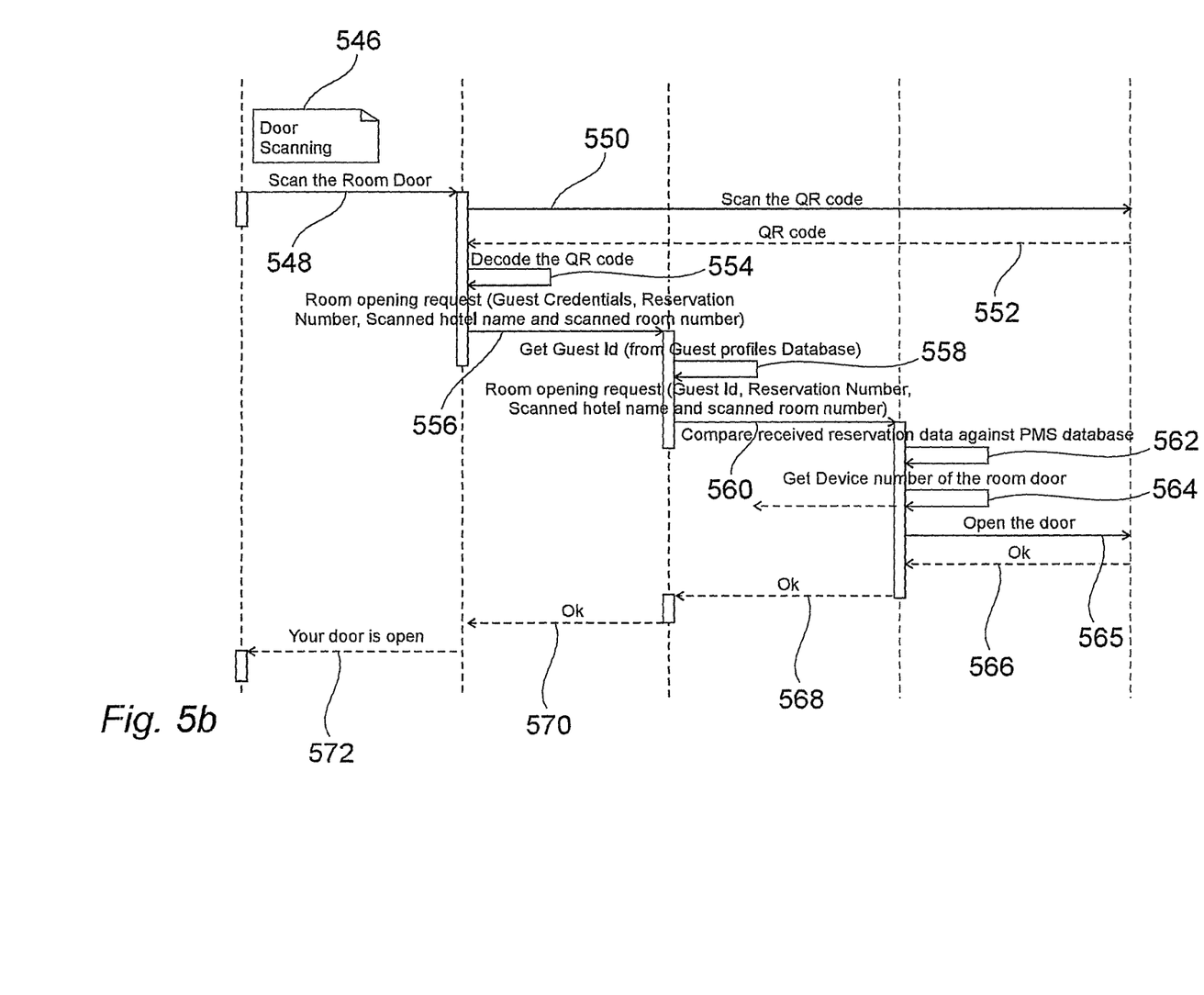

Referring to FIGS. 5a and 5b a full sequence diagram of the process will now be described. A user 500 is in communication with the smart phone application 502. The smart phone application communicates with the central reservation system 504, which in turn communicates with a PMS 506. A room door 508 can be controlled by the PMS 506.

The first part of the sequence diagram relates to a reservation selection process 510. In step 512 the user requests a display of their reservations. The smart phone application requests reservations from the central reservation system by sending guest credentials in step 514. The central reservation system obtains the guest ID in step 516 and reservation details in step 518. The central reservation system sends the reservation list and details to the smart phone application in step 520. These are then displayed to the user in a step 522.

The second part of the sequence diagram relates to the online check-in process 524. The user requests online check-in at 526 through the smart phone 502. The smart phone generates an on line check-in request including guest credentials and reservation number which is sent to the central reservation system in step 528. The guest ID is identified in step 530 and the online check-in request including the guest ID and the reservation number is sent to the PMS step 532. The PMS checks the reservation number against the guest ID in step 534 and the check-in day against the current day in step 536. The PMS then assigns the room number if the checks are both positive. The PMS then communicates the room number to the central reservation system in step 540, which in turn sends a communication to the smart phone in step 542. This is then displayed to the user in step 544.

In the third part of the sequence diagram the door scanning process 546 is described. The user requests the smart phone to scan the room door in step 548. The smart phone is used to scan the QR code or other appropriate label in step 550 and the code is read into the smart phone in step 552. The smart phone decodes the QR code in step 554. From the decoded QR code the smart phone sends a room opening request in step 556 to the central reservation system. The room opening request includes the guest credentials, the reservation number and the scanned hotel name and hotel room number from the QR code. The central reservation system obtains the guest ID in step 558 and then sends a room opening request to the PMS at step 560. This room opening request includes the guest ID, the reservation number, the scanned hotel name and the scanned room number. The PMS makes a comparison of the received reservation data against the PMS database in step 562. The PMS database includes a list or lists of all reservations relevant to the particular PMS. If the comparison is matching, the device number of the room door is obtained in step 564. The PMS then instructs opening of the door in step 564 which is communicated to the door and the door opens at step 565. When the door is opened the PMS can identify that this has occurred in step 566 by means of an LED display on the PMS for example. The PMS optionally indicates to the central reservation system that the door has been opened in step 568 and the central reservation may communicate this to the smart phone application in step 570. The smart phone application may present a message to the user indicating that the door is open at step 572; alternatively the door opening will indicate the same to the user.

This invention has been described with reference to the opening of hotel doors, but may equally apply to other environments, either related to the travel environment or not. Likely use of the present invention would be in situations where a user requires access to a place for a short time or for temporary use. Another example of the invention may be the use of this technology for accessing a hire car at the care hire depot. In this case the car hire location is equipped with a transmitter for generating the tones associated with car keys for cars in the vicinity thereof. The user may scan and decode a label on the car in a predetermined and pre-identified location, which was communicated during an earlier reservation or check-in process. The car hire central reservation system and the car hire system can cause the local transmitter to generate a signal corresponding to the tone produced by the key. The car identifies the tone and is unlocked. The real keys and papers may then be found within the vehicle.

A person skilled in the art will understand that some or all of the functional entities as well as the processes themselves may be embodied in software, or one or more software-enabled modules and/or devices, or in any combination thereof. The software may operate on any appropriate computer or other machine.

In one exemplary implementation, the subject matter described herein can be implemented using a non-transitory computer readable medium having stored thereon a computer program comprising instructions for carrying out any of the methods described herein. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or a computing platform or may be distributed across plural devices or computing platforms.

It will be appreciated that this invention may be varied in many different ways and still remain within the intended scope of the invention.

The invention claimed is:

1. A method to allow automatic access by a user to a pre-reserved place, the method comprising:
    receiving at a system a request from a portable electronic device to effect entry into the pre-reserved place, wherein the request includes user data, a reservation number, and location data associated with the pre-reserved place, and the location data is determined from a a code on a label associated with the pre-reserved place;
    identifying a user identification based on the user data;
    comparing, with the system, the user identification, the reservation number, and the location data with a list of reservations to verify that the user identification, the reservation number, and the location data match a reservation associated with the pre-reserved place; and
    if the user identification, the reservation number, and the location data match the reservation associated with the pre-reserved place, automatically sending a signal to cause the pre-reserved place to be opened to allow access by the user.

2. The method of claim 1, wherein the code of the label comprises a QR code.

3. The method of claim 1, wherein the code identifies a name of a hotel and a number of a hotel room of the hotel.

4. The method of claim 1, further comprising:
    processing reservations made by users and storing the reservations in a database for future access.

5. A computer program comprising instructions configured upon execution by a programmable apparatus to:
    receive at a system a request from a portable electronic device to effect entry into a pre-reserved place by a user, wherein the request includes user data, a reservation number, and location data associated with the pre-reserved place, and the location data is determined from a code on a label associated with the pre-reserved place;
    identify a user identification based on the user data;
    compare, with the system, reservation data that includes the user identification, reservation number, and the location data with a list of reservations to verify that the user identification, the reservation number, and the location data match a reservation associated with the pre-reserved place; and
    if the user identification, the reservation number, and the location data match the reservation associated with the pre-reserved place, automatically send a signal to cause the pre-reserved place to be opened to allow access by the user.

6. A system for allowing automatic access by a user to a pre-reserved place, the system comprising:
    a receiver for receiving a request from a portable electronic device to effect entry into the pre-reserved place, wherein the request includes user data, a reservation number, and location data associated with the pre-reserved place, and the location data is determined from a a code on a label associated with the pre-reserved place;
    a guest profile database for identifying a user identification based on the user data;
    a comparison module for comparing the user identification, the reservation number, and the location data with a list of reservations to verify that the user identification, the reservation number, and the location data match a reservation associated with the pre-reserved place; and
    if the user identification, the reservation number, and the location data match the reservation associated with the pre-reserved place, sending a signal to cause the pre-reserved place to be opened to allow access by the user.

7. The system of claim 6, wherein the code of the label comprises a QR code.

8. The system of claim 6, wherein the code identifies a name of a hotel and a number of a hotel room of the hotel.

9. The system of claim 6, wherein the system processes reservations made by users and stores the reservations in a database for future access.

10. A non-transitory computer readable medium comprising:
    an application stored thereon and comprising instructions configured upon execution to read and decode a label including a code associated with a pre-reserved place to determine location data, and communicate a request including user data, a reservation number, and the location data to a system to effect entry to the pre-reserved place,
    wherein receiving the request at the system causes the system to:
    identify a user identification based on the user data,
    compare the user identification, the reservation number, and the location data with a list of reservations to verify that the user identification, reservation number, and location data match a reservation associated with the pre-reserved place, and
    if the user identification, the reservation number, and the location data match the reservation associated with the pre-reserved place, automatically send a signal to cause the pre-reserved place to be opened to allow access by the user.

11. A method to allow automatic access by a user to a pre-reserved hotel room, the method comprising:
    receiving, at a central reservation system, a request from a portable electronic device that includes user data and location data, wherein the location data indicates a hotel name and hotel room number associated with the pre-reserved hotel room, and the location data is determined from a label including a code associated with the pre-reserved hotel room that identifies the hotel name and the hotel room number associated with the pre-reserved hotel room;
    querying a guest profile database based on the user data to determine a guest identification;
    communicating a room opening request from the central reservation system to a property management system corresponding to the pre-reserved room, the room opening request including the guest identification, the reservation number, the hotel name, and the hotel room number;
    verifying, at the property management system, that the guest identification, the reservation number, the hotel name, and the hotel room number match a reservation associated with the pre-reserved hotel room; and
    sending a signal to cause the pre-reserved hotel room to be opened to allow access by the user in response to the guest identification, the reservation number, the hotel name, and the hotel room number matching the reservation associated with the pre-reserved hotel room.

12. The method of claim 11, wherein the user data comprises a credit card number associated with the user.

13. The method of claim 11, further comprising:
    in response to sending the signal to cause the pre-reserved hotel room to be opened, communicating an indication to the portable electronic device that a door of the pre-reserved hotel room has been opened.

14. The method of claim 11, further comprising:
    receiving a request from the portable electronic device to check-in for a pre-reserved booking at the central reservation system, the request including user data and a reservation number associated with the pre-reserved booking;

determining whether check-in can be validated for the pre-reserved hotel room based on an availability associated with the pre-reserved hotel room; and in response to determining that check-in can be validated, associating the pre-reserved hotel room with the pre-reserved booking and sending the hotel room number associated with the pre-reserved hotel room to the portable electronic device.

* * * * *

UNITED STATES PATENT AND TRADEMARK OFFICE
CERTIFICATE OF CORRECTION

PATENT NO. : 8,903,425 B2  Page 1 of 1
APPLICATION NO. : 13/274026
DATED : December 2, 2014
INVENTOR(S) : Guenec et al.

It is certified that error appears in the above-identified patent and that said Letters Patent is hereby corrected as shown below:

In the Specification:

Column 3, line 42, change "allows" to --allow--

Column 4, line 36, change "systems" to --system--

In the Claims:

Column 7, claim 1, line number 9, after "a" delete "a"

Column 7, claim 6, line number 55, after "a" delete "a"

Signed and Sealed this
Thirty-first Day of March, 2015

Michelle K. Lee
*Director of the United States Patent and Trademark Office*